April 6, 1937.　　C. E. H. COLLIANDER　　2,076,293
OPHTHALMIC MOUNTING
Filed June 7, 1935
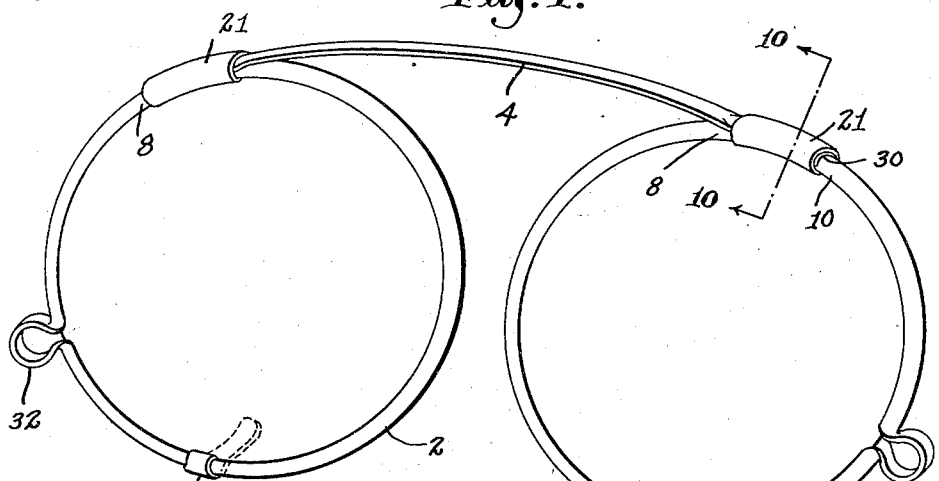
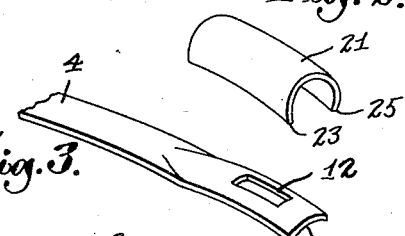
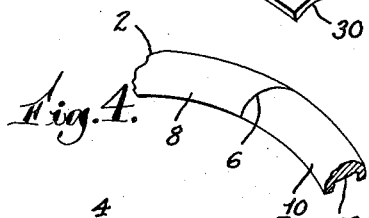
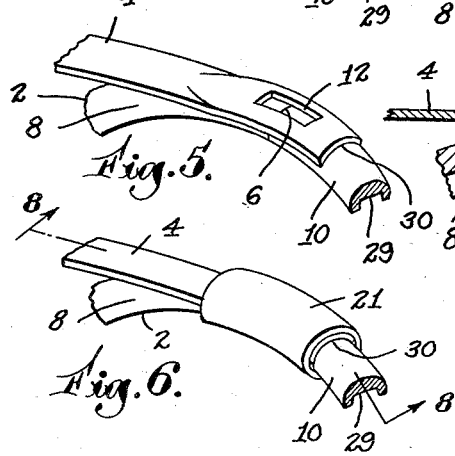
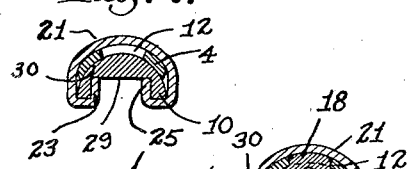
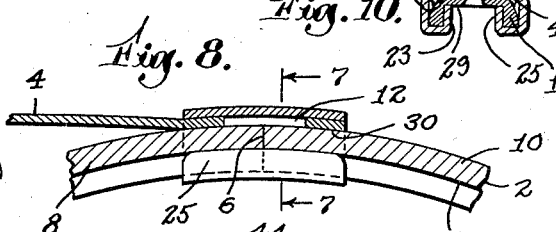
Inventor
CARL E. H. COLLIANDER
by　　　　　
Attorney Patented Apr. 6, 1937

2,076,293

UNITED STATES PATENT OFFICE 2,076,293

OPHTHALMIC MOUNTING

Carl E. H. Colliander, Providence, R. I., assignor to Lorgnettes, Inc., Providence, R. I., a corporation of Rhode Island Application June 7, 1935, Serial No. 25,433

7 Claims. (Cl. 88—41)

The present invention relates to ophthalmic mountings, and more particularly to mountings of the type that are provided with darkened glasses that are adapted to be positioned in front of the lenses of other ophthalmic mountings to reduce the glare of strong sunlight, or the like.

An object of the present invention is to reduce the cost of manufacture of ophthalmic mountings of the above-described character without detracting from their efficiency and utility.

A further object is to provide a novel joint for a split, lens-holding rim.

Another object is to provide a novel connection between a lens-holding rim and a bridge.

Other and further objects will be explained hereinafter in connection with the accompanying drawing, in which Fig. 1 is a perspective of an ophthalmic mounting embodying the present invention in its preferred form; Fig. 2 is a perspective, upon a larger scale, of the clamp employed to clamp together the ends of the rim and the bridge; Fig. 3 is a fragmentary perspective, upon the same larger scale, of the bridge thereof; Fig. 4 is a corresponding fragmentary perspective, upon the same larger scale, of the portion of a rim to which the bridge is adapted to be secured; Fig. 5 is a similar, fragmentary enlarged perspective showing the bridge of Fig. 3 in position on the portion of the rim shown in Fig. 4; Fig. 6 is a view similar to Fig. 5, and similarly enlarged, showing the clamp of Fig. 2 clamped about the parts shown in Fig. 5; Fig. 7 is a section, upon a still larger scale, taken upon the line 7—7 of Fig. 8, showing the parts before they have been completely assembled; Fig. 8 is a section, upon the same scale as in Fig. 7, taken upon the line 8—8 of Fig. 6, looking in the direction of the arrows, also showing the parts before they have been completely assembled; Fig. 9 is a section corresponding to Fig. 8, showing a step in the assembling of the parts; and Fig. 10 is a section corresponding to Fig. 7, taken upon the line 10—10 of Fig. 1, after the parts have been completely assembled.

The ophthalmic mounting of the present invention comprises two rims 2 connected by a spring bridge 4. Each rim is split at its point of junction with the bridge, as shown at 6, the split ends of the bridge being shown at 8 and 10. The split ends 8 and 10 of each rim 2 are locked together and to an end of the bridge 4 by means of cooperating locking elements. These locking elements are illustrated as comprising a slot or other aperture 12 in an end, and extending completely through the material, of the bridge 4 and a pair 16 and 18 of tongues or other projections provided at the extremities of the split ends 8 and 10 of the rim and disposed in the slot 12, and a clamp 21 clamping together the said ends of the rim and the bridge. The tongues 16 and 18 are forced out of the rim and into the slot 12 during the assembling of the rims, as will hereinafter be explained.

As the ends of the bridge 4 are positioned against the exterior surfaces of the rims, it is desirable to round them over in cross section, as illustrated at 30, to conform to the surfaces of the rims. The clamp 21 has a correspondingly rounded body portion engaging against the said rounded end 30 of the bridge, and two arms 23 and 25 bent against the sides of the said ends 8 and 10 of the rim and bent into the lens-receiving groove 29, as illustrated more particularly in Figs. 7 and 10.

The parts are first assembled, as illustrated in Fig. 5, with the end of the bridge 4 disposed over the ends 8 and 10 of the rim, and before the tongues 16 and 18 have been formed on the rim. The clamp 21 is then applied, as illustrated in Figs. 6, 7 and 8. A sharp-pointed end 40 of a die 42 is then forced against the extremities of the ends 8 and 10 of the rim, as illustrated in Fig. 9, while another die 44 supports the clamp 21, thus upsetting the said extremities to form the tongues 16 and 18 and, at the same time, to drive them completely into the slot 12. The clamp 21 will then hold the ends of the rim 2 and the bridge 4 together, the tongues 16 and 18 being held in the slot 12 in abutting relation to prevent separation of the ends of the rim in a peripheral direction.

As the split ends 8 and 10 of the rims 2 are permanently secured together when joined to the ends of the bridge 4, this would prevent the insertion in the lens-receiving groove 29, of glasses 31, which are usually smoked or colored. The rims are, therefore, each provided with a loop 32, bent in against the glass 31 after it has been inserted in the rim, thereby closing the rim over against the glass 31 in the rim. The loop 32 then serves the further function of a handle with which to manipulate the ophthalmic mounting.

In operation, the loops 32 are grasped between the fingers and thumbs of one's hands, and the rims 2 are moved away from each other, in opposition to the spring action of the bridge 4. The ophthalmic mounting is then positioned in front of one's spectacles upon the face, with the glasses 31 in front of the spectacle lenses. The spring bridge 4 is now allowed to actuate the rims 2 towards each other until the tongues 38 engage against the lower sides of the spectacle rims (not shown). The ophthalmic mounting will be held in place on the spectacles by the inherent resiliency of the spring bridge 4.

Other modifications will occur to persons skilled in the art and all such are considered to fall within the spirit and scope of the invention, as defined in the appended claims.

What is claimed is:

1. An ophthalmic mounting comprising two members one of which is a split, lens-holding rim, having a lens-receiving groove the ends of the rim and the other member being provided with cooperating locking elements for locking the ends of the rim together and for locking the rim to said other member, the locking elements comprising aperture means in one of the members, projection means on the other member disposed in the aperture means, and a clamp bent around the said other member and the rim and having two arms bent into the lens-receiving groove.

2. An ophthalmic mounting comprising two members, namely, a split, lens-holding rim having a lens-receiving groove and a bridge, the ends of the rim and an end of the bridge being provided with cooperating locking elements for locking the ends of the rim together and for locking the rim to the bridge, the locking elements comprising a slot on one of the members, a tongue on the other member disposed in the slot, and a clamp bent around the bridge and the rim and having two arms bent into the lens-receiving groove.

3. An ophthalmic mounting comprising two members, namely, a split, lens-holding rim having a lens-receiving groove and a bridge, the ends of the rim and an end of the bridge being provided with cooperating locking elements for locking the ends of the rim together and for locking the rim to the bridge, the locking elements comprising aperture means in the said end of the bridge, a projection on each end of the rim disposed in the aperture means, and a clamp bent around the bridge and the rim and having two arms bent into the lens-receiving groove.

4. An ophthalmic mounting comprising a split, lens-holding rim having a lens-receiving groove and a bridge, a projection being provided at the extremity of each end of the rim, an end of the bridge being provided with aperture means, the projections being disposed in the aperture means in abutting relation, and a clamp bent around the bridge and the rim and having two arms bent into the lens-receiving groove.

5. An ophthalmic mounting comprising two members, namely, a split, lens-holding rim and a bridge, the lens-holding rim having a lens-receiving groove and a rounded exterior surface, the ends of the rim and an end of the bridge being provided with cooperating locking elements for locking the ends of the rim together and for locking the rim to the bridge, the locking elements comprising an aperture in one of the members and a projection on the other member disposed in the aperture, the said end of the bridge being positioned against the exterior surface of the rim and rounded in cross section to conform to the said surface of the rim, and a clamp having a correspondingly rounded body portion engaging against the said rounded end of the bridge and two arms bent against the sides of the said ends of the rim and bent into the lens-receiving groove.

6. An ophthalmic mounting comprising two split lens-holding rims each having a lens-receiving groove and a spring bridge for connecting the rims together, the bridge being provided at each end with a slot that extends completely through the material of the bridge, the ends of the bridge being positioned against and conforming to the exterior surfaces of the rims with the slots positioned adjacent to the ends of the respective rims, the extremities at the ends of each rim being each provided with a tongue, the tongues of one of the rims being disposed in and extending completely into one of the slots in abutting relation, the tongues on the other rim being disposed in and extending completely into the other slot in abutting relation, and a clamp engaging against and bent around each end of the bridge and having two arms bent against the sides of the said ends of the corresponding rim and bent into the lens-receiving groove.

7. An ophthalmic mounting comprising a split, lens-holding rim having a lens-receiving groove and a bridge having aperture means, a projection on each end of the rim extending into the aperture means in the bridge, and a clamp bent around the bridge and the ends of the rim and having two arms bent into the lens-receiving groove.

CARL E. H. COLLIANDER.